US011591245B2

(12) United States Patent
Revanur et al.

(10) Patent No.: US 11,591,245 B2
(45) Date of Patent: Feb. 28, 2023

(54) HIGH SALINITY WATER PURIFICATION PROCESSES AND SYSTEMS

(71) Applicants: Ravindra Revanur, Fremont, CA (US); Stephen M. Mosher, Chandler, AZ (US)

(72) Inventors: Ravindra Revanur, Fremont, CA (US); Stephen M. Mosher, Chandler, AZ (US)

(*) Notice: Subject to any disclaimer, the term of this patent is extended or adjusted under 35 U.S.C. 154(b) by 290 days.

(21) Appl. No.: 16/938,055

(22) Filed: Jul. 24, 2020

(65) Prior Publication Data

US 2021/0024395 A1    Jan. 28, 2021

Related U.S. Application Data

(60) Provisional application No. 62/878,219, filed on Jul. 24, 2019.

(51) Int. Cl.
| | | |
|---|---|---|
| *B01D 61/00* | (2006.01) | |
| *B01D 61/02* | (2006.01) | |
| *B01D 61/58* | (2006.01) | |
| *B01D 69/02* | (2006.01) | |
| *C02F 1/42* | (2006.01) | |

(Continued)

(52) U.S. Cl.
CPC .............. *C02F 9/00* (2013.01); *B01D 61/002* (2013.01); *B01D 61/025* (2013.01); *B01D 61/58* (2013.01);
(Continued)

(58) Field of Classification Search
CPC .................. B01D 61/002; B01D 69/02; B01D 2311/2623; B01D 2325/42
See application file for complete search history.

(56) References Cited

U.S. PATENT DOCUMENTS

| 5,229,003 A | 7/1993 | Duyvesteyn |
|---|---|---|
| 6,458,184 B2 | 10/2002 | Featherstone |

(Continued)

FOREIGN PATENT DOCUMENTS

| CN | 105289334 A | * | 2/2016 |
|---|---|---|---|
| EP | 3130391 A1 | | 2/2017 |

OTHER PUBLICATIONS

Zuo, Hao-Ran, et al. "Ion exchange resin blended membrane: Enhanced water transfer and retained salt rejection for forward osmosis." Desalination 421 (2017): 12-22. (Year: 2017).*

(Continued)

*Primary Examiner* — Bradley R Spies
(74) *Attorney, Agent, or Firm* — Larry K. Roberts

(57) ABSTRACT

A high salinity water purification system and process, including a forward osmosis system and a reverse osmosis or nanofiltration system. A concentrated brine of a zinc or iron complex combined with a salt or acid draws pure water across the FO membrane from the influent water. The diluted brine is pumped through a vessel holding an anionic adsorption media to remove the zinc or iron complex and the resultant brine is passed through the RO or nanofiltration system to obtain purified water and a concentrated brine stream. The adsorption media is regenerated by a rinse cycle using fresh water or water from the RO system, removing the zinc or iron complex adhered to the media. The resultant brine is stored and mixed with the output of the RO system. Charged membrane can be used as a standalone membrane in FO process or in combination with resin or resin embedded membrane.

18 Claims, 4 Drawing Sheets

(51) Int. Cl.
*C02F 1/44* (2006.01)
*C02F 101/20* (2006.01)
*C02F 9/00* (2006.01)
*C02F 1/66* (2006.01)

(52) U.S. Cl.
CPC .......... *B01D 69/02* (2013.01); *B01D 2311/06* (2013.01); *B01D 2311/25* (2013.01); *B01D 2311/2623* (2013.01); *B01D 2313/18* (2013.01); *B01D 2317/02* (2013.01); *B01D 2317/08* (2013.01); *B01D 2325/022* (2013.01); *B01D 2325/42* (2013.01); *C02F 1/42* (2013.01); *C02F 1/441* (2013.01); *C02F 1/445* (2013.01); *C02F 1/66* (2013.01); *C02F 2001/422* (2013.01); *C02F 2101/203* (2013.01); *C02F 2201/005* (2013.01); *C02F 2301/046* (2013.01); *C02F 2303/16* (2013.01)

(56) References Cited

U.S. PATENT DOCUMENTS

2015/0273396 A1 10/2015 Hancock et al.
2018/0354817 A1 12/2018 Burclaff
2020/0180989 A1 6/2020 Mosher

OTHER PUBLICATIONS

Cao G—CN-105289334-A machine translation—Feb. 2016 (Year: 2016).*
Separation of Zinc from Liquid Media, (https://origin-www.dow.com/en-us/water-and-process-solutions/resources/periodic-table/zinc).
USPTO Office Action dated Mar. 8, 2022 regarding U.S. Appl. No. 16/706,601.

* cited by examiner

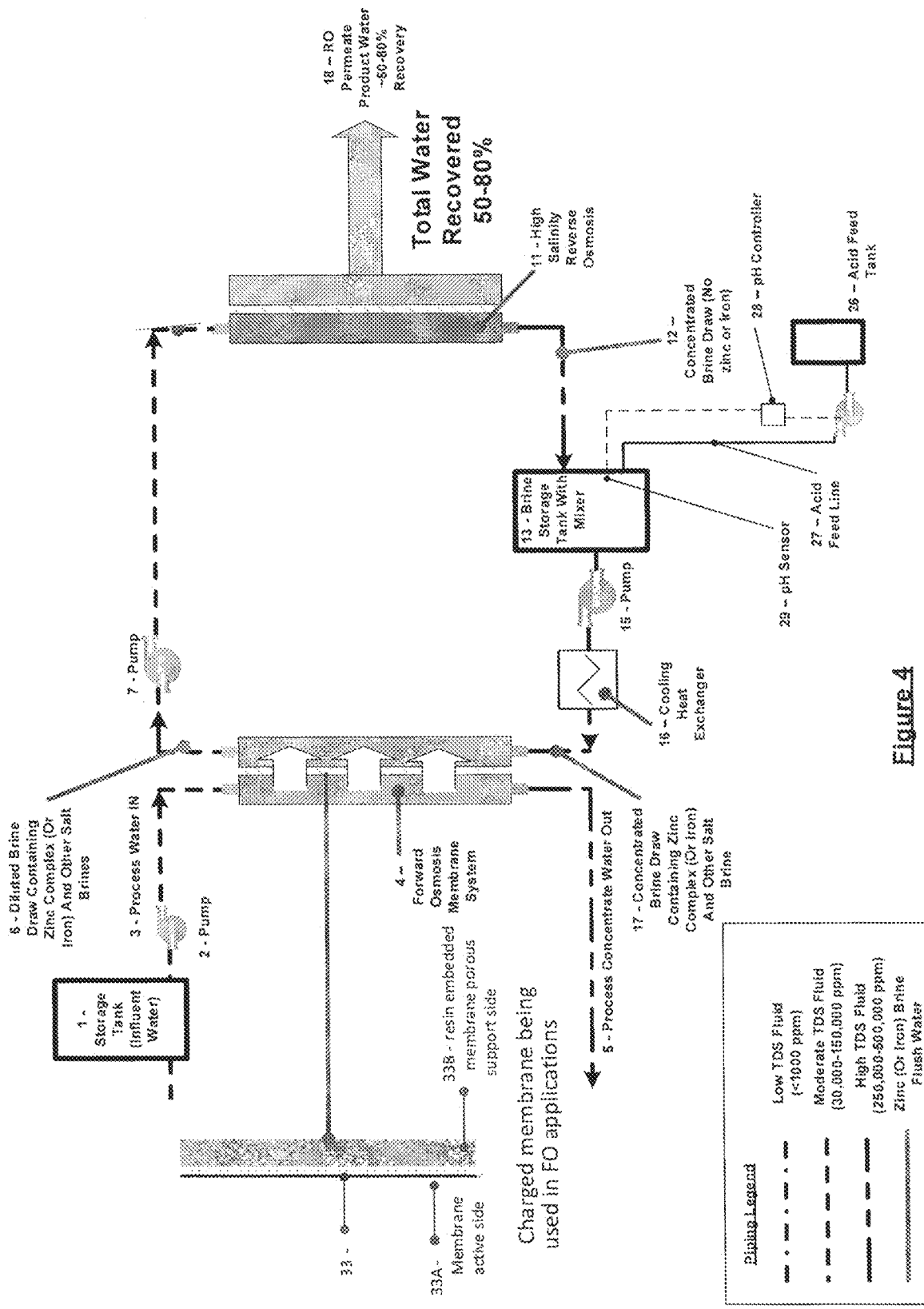

HIGH SALINITY WATER PURIFICATION PROCESSES AND SYSTEMS

CROSS-REFERENCE TO RELATED APPLICATION

This application claims the benefit of U.S. Provisional Application No. 62/878,219 filed Jul. 24, 2019, the entire contents of which are hereby incorporated by reference.

BACKGROUND

One of the greatest challenges in water treatment is addressing high levels of total dissolved solids (TDS) in water—basically: how to desalinate high TDS solutions. An emerging treatment technology is a process called "forward osmosis" (FO). This process differs from traditional reverse osmosis (RO). A traditional RO system pushes water at high pressure through a membrane that essentially filters out dissolved minerals and produces a clean water stream and a concentrated salt water stream. An FO system draws water across the membrane to purify it at a low pressure which reduces membrane fouling potential. With an RO, the higher the total dissolved solids of the water, the higher the pumping pressure required and subsequently higher capital and operating cost. The higher the overall total dissolved solids, the more complex and expensive is the technical solution.

One example of high TDS water is produced water, which is the water that comes from deep within the ground during the production of oil. As oil is brought out of the ground, water comes with it, which is thus called "produced water". This water is very difficult to treat as it not only has high levels of suspended solids and organics which can blind filter media and membranes, the water is also extremely high in dissolved mineral salt content. Typically, the produced water is either hauled off site to a disposal well or directly injected back into the ground for disposal. Hauling the water is very costly and recent research indicates that injecting produced water back into injection wells can cause formation damage underground. For that reason, injection wells are being reduced as a possible solution for waste disposal. The best solution is to minimize the amount of water put back into the ground and utilize any good water for other industrial uses. Yet treating this water is extremely difficult.

BRIEF DESCRIPTION OF THE DRAWINGS

Features and advantages of the disclosure will readily be appreciated by persons skilled in the art from the following detailed description when read in conjunction with the drawing wherein:

FIG. 4 is a schematic diagram illustrating a further exemplary embodiment of a high salinity water purification system and process.

DETAILED DESCRIPTION

Figure 1:
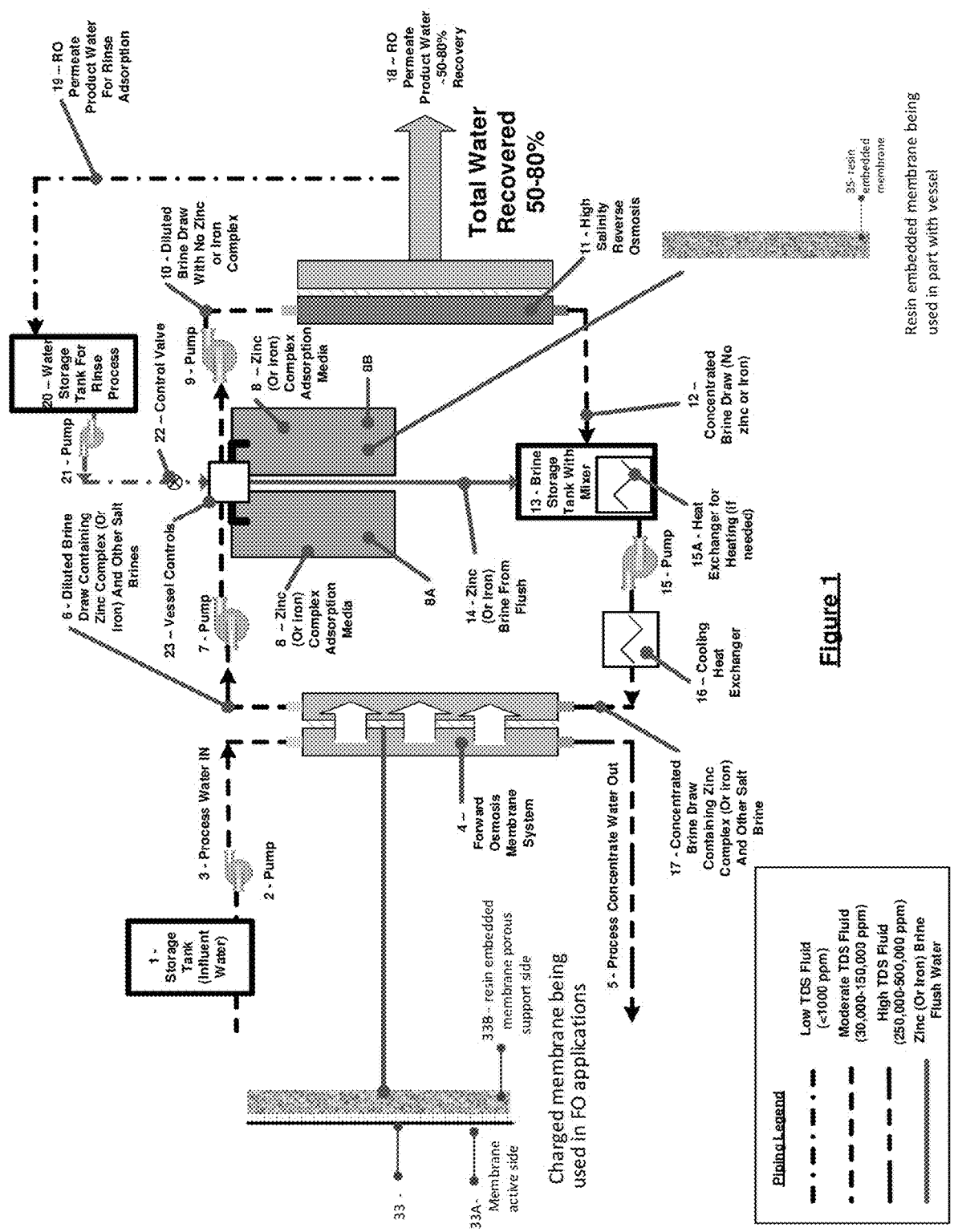
FIG. 1 is a schematic diagram illustrating an exemplary embodiment of a high salinity water purification system and process.

In the following detailed description and in the several figures of the drawing, like elements are identified with like reference numerals. The figures are not to scale, and relative feature sizes may be exaggerated for illustrative purposes.

Water naturally wants to be in a state of equilibrium with respect to mineral content. An FO system utilizes a high TDS brine stream with stronger osmotic attraction than a waste stream to pull or draw pure water from the waste stream across a semipermeable membrane into the high TDS brine which thus dilutes it. The osmosis process will naturally continue until the osmotic attraction of the two streams are approximately equivalent. The water that is pulled across the membrane and essentially dilutes the brine solution is then extracted from the brine in various traditional treatment technologies, most commonly reverse osmosis (RO) or nanofiltration. The pure water is produced in one stream from the RO and the other stream re-concentrates the brine solution which then becomes the feed water back to the FO membrane. The process is then repeated in a continual process.

The benefit of the FO system is the natural osmotic driving pressure is much lower than the pressure on a traditional RO membrane which minimizes the fouling potential and subsequently reduces operating and maintenance cost of the FO membrane system. A significant challenge with implementing a forward osmosis system is how to efficiently process and re-concentrate extremely high TDS brines. This application describes low cost, high efficiency methods of accomplishing high TDS brine draw re-concentration.

As noted above, the forward osmosis solution is highly advantageous because instead of pushing water across a membrane at high pressure which damages separation membranes (often beyond repair), FO "pulls or draws" pure water across the membrane at low pressure through natural osmosis and a brine solution which allows for easier and more effective membrane cleaning. This minimizes membrane fouling, whereas at high pressure RO membranes become fouled beyond repair. In the FO continual process, the pure water is produced and the concentrate stream from the RO system re-concentrates up the brine to continue pulling pure water across the FO membrane. However, in this FO brine recycling process, there are limitations as to how high a reverse osmosis system can re-concentrate the reject brine stream which limits how much water and what TDS of water an FO system can process. This new process technology advancement works in combination with the reverse osmosis system, or alternatively a nanofiltration system, to concentrate up the brine levels to even higher levels than ever possible (excluding use of high energy, high cost evaporators) which will help achieve greater water savings at a lower operating and capital cost. As is well known in the art, nanofiltration uses a different membrane than RO, with a different pore size to filter differently.

First Embodiment

A two-step water purification system and process are illustrated in FIG. 1. This embodiment employs a strong anionic base adsorption media such as a resin and/or resin embedded membrane to recycle a zinc or iron-based brine draw combined with a sodium or magnesium-based brine draw (or acid) before a high salinity reverse osmosis or nanofiltration system for improved brine draw recycling performance and overall higher efficiency. Zinc or iron-based brines are unique in that they naturally have an extremely high osmotic attraction which makes it beneficial as an FO brine draw. Zinc combined with a salt such as chloride can become "complexed" thus giving it a natural selective attraction/affinity to the adsorption media used in the purification process. This happens when the zinc or iron is in combination with a brine (sodium chloride as an example) or in combination with an acid such as hydrochloric acid. Either of these two conditions makes the zinc into the form that the adsorption media will adsorb it, as described more fully below. The brine is in sufficient concentration levels to complex the zinc or iron-based compound.

Zinc or iron-based brines are also unique in that there are anionic adsorption media with specific chemical affinity for zinc or iron-based brines. What makes this process even more unique is that the adsorption media rinse "elutant" for these specific adsorption media, e.g. a resin and/or resign embedded membrane, is plain water as opposed to another brine, acid, or base chemical. This makes rinse/flush cost of the adsorption media solution extremely inexpensive and low energy.

In the following description of the first embodiment, zinc-based brines are specifically described. it will be understood that iron-based brines also provide similar properties and may alternatively be used in the process.

The first step in processing the brine from the FO system is to separate the zinc-based brine from a sodium or magnesium-based brine, or acid (combined with pure water) using the adsorption media. The second step is to process the sodium or magnesium-based brine (or acid) by purifying it with a standard high salinity RO or nanofiltration system, thus producing clean water and a re-concentrated brine. This re-concentrated brine is then blended with the eluted zinc-based brine from the adsorption media rinse process. The combined brine solution is then fed back to the FO membrane and is used in a continual process.

The first step is done in a manner that uses a low-energy strong base anion exchange media (resin or membrane) and fresh water for the flush. Utilizing fresh water for rinse is a key factor because it is extremely low cost. There are many resins and membranes that can separate zinc from resin (and resin embedded membranes), but the more zinc to be removed, the more flushing chemical needed which drives up operating cost significantly. The process of this embodiment by which the unique anionic media removes zinc involves the zinc-based brine being combined with another brine (or acid, such as HCl). This combined brine is in a multivalent form as opposed to a normal cationic phase, thus allowing the anionic adsorption media to have a strong natural attraction to it. This strong attraction binds or adheres the zinc multivalent anionic complexes to the anionic media. When the brine is removed from the media and the media goes into the rinse or backwash cycle with fresh water and/or alkaline water, the accompanying brine is flushed from the adsorption media which reverses the multivalency of the zinc-based brine, and thus the zinc-based brine is easily removed from the resin with just low total dissolved solids water. For this reason, the FO brine draw includes a blend of multiple brine solutions or the zinc-based brine is in combination with an acid (such as HCl).

This process utilizes a combined blend of brines or acid, to include zinc chloride, zinc bromide, ferric chloride, sodium chloride, sodium bromide, and or magnesium chloride as primary examples (also to include: LiCl, CaCl2), LiCl) and HCl, HCl, KCl, CsCl, NH 4Cl, and HONH 3Cl). The elements from Ni2+, Fe2+, Co2+, Mn2+, Fe3+, Cu2+, Sn4+, In3+, Zn2+, Cd3+, Pb3 under certain specific environments form halo-metal complexes that can be separated from these resin and/or resin embedded membranes.

The acid can be in solution with the zinc brine, but that is not necessary. Zinc chloride will attach to the adsorption media in the presence of an acid (such as HCl) or in the presence of another brine (such as NaCl). The acid would be in the brine or in place of the salt-based brine and consistent throughout the FO system. To recover the costly brine draw material and minimize waste, strong base anion adsorption media is used to first separate the zinc bromide or zinc chloride brine salts thus leaving the effluent solution as only pure water combined with the magnesium chloride, sodium bromide, or sodium chloride brine draw to be processed by the high salinity RO or nanofiltration system. The strong base anion adsorption media is flushed with clean, permeate water in a final step of the process.

Referring now to the schematic of FIG. 1, a storage tank 1 holds the influent water for the process, which is a moderate TDS fluid, in the range of 30,000 to 150,000 ppm. The process water 3 is pumped by pump 2 to provide a brine stream on the input side of FO membrane system 4. The output side of the FO membrane 33 has a concentrated brine draw containing Zinc complex (or iron) and other salt brine. The concentrated brine draw is a high TDS fluid, in the range of 250,000 to 500,00 ppm. The high brine draw fluid draws pure water across the FO membrane, leaving a diluted brine draw, which did not pass through the FO membrane, containing the Zinc complex (or iron) and other salt brine. With pure water having been drawn out by the FO system, the process water leaving the FO system is a concentrated fluid, with a TDS in the range of 300,000 to 500,000 ppm. The concentrated process fluid 5 is waste from the process, to be hauled off-site or otherwise disposed of. In accordance with an aspect of an embodiment of the invention, the membrane 33 is a "charged" membrane, with a membrane active side 33A located on the input side of the FO system 4, and a resin-embedded membrane porous support side 33B on the FO output side. Charged membranes are discussed more fully below with respect to FIGS. 3 and 4.

The diluted brine draw 6 from the FO process is pumped by pump 7 through vessel controls 23, including a valve system, to media vessels 8A, 8B holding a Zinc or iron complex adsorption media, e.g. a strong anionic base resin or membrane which has an extremely high osmotic attraction to the zinc or iron based complexes in the diluted brine draw. The zinc or iron complex adheres to the adsorption media, separating the zinc bromide or zinc chloride so that the output 10 pumped from the vessels 8A, 8B by pump 9 is essentially free of the zinc or iron complex. This diluted brine draw 10 has NaCl, NaBr or MgCl2 (or acid) and is a moderate TDS fluid, on the order of 30,00 to 150,000 ppm.

One example of the adsorption media suitable for the purpose is Strong Base Anion, Gel Type 1, Quaternary Amine Functional Group, Styrene Crosslinked with Divinylbenzene, Chloride Form. In accordance with a further aspect, the vessels 8A, 8B may include a resin-embedded membrane 35. Any polymer, modified polymers or polymer solutions that can be transformed into a membrane form can be used to prepare resin embedded membranes. Examples of well-known polymers being used to make membranes are polyamides, polysulfones, polyvinylidene fluoride and polypropylene. The resin-embedded membrane 35 may be used in combination with the adsorption media 8, or may replace the adsorption media. Resin-embedded membranes are described more fully below in connection with FIG. 3.

Zinc chloride when combined in solution with sodium (or magnesium) chloride brine will form a divalent anionic complex of [ZnCl4]2- which has a direct chemical "selective" affinity for strong base anion resin and membrane media. In this form, the Zinc complex will be adsorbed onto the media (resin or membrane) but allow other cations to pass and not be adsorbed on the media. The media is maintained in the chloride form, but with such high levels of chloride present in the subsequent brine (sodium or magnesium chloride brine), the chloride is not affected or exchanged. Just the zinc chloride complex is adsorbed to the resin or membrane media. The adsorption media, such as the resin, has selective attraction to various ions such as chloride, hydroxide, and hydrogen. When the resin goes through an ion exchange process, one ion is exchanged (ion to be removed) for the "ion form" (ion naturally on the resin). In this case, if there was "ion exchange", chloride would be released into the water as the zinc was adsorbed. But since the brine has such a high concentration of chloride in the brine, e.g., at least 30,000 ppm, there is no release of the chloride. In this case, there is not technically "ion exchange;" there is no actual exchange of ions, just adsorption.

During the rinse or "flush" step of the resin to remove the zinc chloride complex from the resin or membrane, the sodium or magnesium chloride brine is flushed from the media tank, then RO permeate water fills the tank. This removal of the brine and replacement with low TDS water neutralizes the valency of the complex which reverses the adsorption process, thus zinc chloride complex sloughs off the resin and dissolves into the RO water. In the flush process, a minimal amount of RO water or alkaline water is utilized to maximize zinc chloride concentration in the solution to re-form a brine. This flushed product is then blended back with rejection brine from the high salinity RO system (sodium or magnesium chloride brine) which forms a blended high brine solution (zinc chloride and sodium or magnesium chloride). This then reestablishes the zinc chloride complex and thus the purification process can be repeated. The zinc chloride has a natural strong osmotic "draw" which makes it beneficial as a brine draw in the forward osmosis process. An important feature is the use of fresh water to neutralize the zinc chloride complex in a continual process with no required special rinse chemicals, significantly reducing the material costs in the process.

The diluted brine draw 10 is pumped from vessels 8A, 8B into a high salinity RO membrane system 11, with the fluid passed through the membrane constituting RO permeate water, essentially or relatively pure water. The relative percentage of RO permeate water recovered from the process water 3 is typically on the order of 50% to 80%.

The brine draw 12 from the RO system which did not pass through the RO membrane is a concentrated brine draw, a high TDS fluid with TDS 250,000 ppm. The brine draw 12 does not have zinc or iron), which had been removed by the adsorption media 8 in vessels 8A, 8B. The concentrated brine draw 12 is stored in brine storage tank 13, for mixing with zinc (or iron) flushed from the adsorption media during a rinse cycle. The storage tank may include a mixer and optional heat exchanger 14.

In this embodiment, a part 19 of the RO permeate water is used for rinse adsorption in a rinse cycle for the adsorption media 8 in vessels 8A, 8B. The RO permeate water used for this purpose is stored in tank 20 for use during the rinse cycle.

During the rinse cycle, the vessel 8A or 8B is isolated from the pumps 7 and 9 by valves of the vessel controls 23. The sodium or magnesium-based brine (or acid) is drained from the isolated vessel, either to the brine storage tank 13 or pumped to the RO. Permeate product water 19 stored in tank 20 (or fresh water from another source) is released into and fills the isolated vessel through control valve 22, reversing the multivalent condition of the zinc (or iron) complex previously adsorbed onto the media in the isolated vessel. The media releases the zinc (or iron) brine which is dissolved back into the permeate water (or fresh or tap water). During the rinse cycle, the water released into the vessel 8A may be allowed to rest in contact with the media. An optional step is to recirculate the permeate water over the media to minimize water used in the process and increase zinc (or iron) concentration in solution. After the cycle is complete, with the zinc in solution in the water, the resulting brine is released from the isolated vessel by operation of vessel controls 23 (essentially a three-way valve) into tank 13 for mixing with the concentrated brine draw 12. Now, to revert to the purification mode for the system, valve 22 is closed, and vessel controls 23 reconnect the pump 7 to the input of the isolated vessel and to pump 9, and pumps 2, 7, 9 and 15 are activated. The resulting brine 17 from tank 13 is a concentrated brine draw containing a Zinc or iron complex and other salts.

The zinc-based (or iron) removal media vessels 8A and 8B are designed to be in a "dual", "twin", or "multiple train" mode where one vessel is online and operational while the other vessel (s) is/are regenerated then put back into a "standby" ready-for-use condition. There is a continuous flow of zinc-based (or iron) concentrate waste from the rinse process; thus the brine draw is optimally recycled.

The tank 13 may include a heat exchanger 14 for heating the brine if necessary, and a cooling heat exchanger 16 may be located downstream of the heat exchanger. The purpose of the cooling heat exchanger is to cool down the brine draw prior to entering the forward osmosis membrane to minimize mineral fouling on the forward osmosis membrane. This brine draw loop is a continuous processing loop with multiple pumps. The pumps build up heat over time, so a cooling step controls fluid temperature which in turn minimizes the potential for mineral scale fouling on the FO membrane.

To recover clean water from high brine or highly saline water streams such as sea water, manufacturing waste streams, produced water or fracturing flow back water, the high brine recovery or rinse system may be implemented as noted above. The treatment technology described above splits out the pure water thus making it available for reuse and at the same time re-concentrate up the brine draw so the system works in a continuous low cost, high efficiency process. This is done in a manner that uses a low energy strong base anion adsorption media, such as a resin, and fresh water for resin rinse. Utilizing fresh water for rinsing is an important factor because it is extremely low cost.

There are many resins that can separate zinc from resin, but the more zinc to be removed, the more regeneration chemical is needed, which drives up operating cost significantly. Traditional cationic resins used for zinc removal would utilize so much rinse chemical that the process would be cost prohibitive. In the process described above regarding FIG. 1, the unique anionic resin removes zinc from the zinc-based brine which is combined with another brine (or acid, like HCl); in this state the brine is multivalent thus allowing the anionic resin to have an attraction to it. When the resin goes into the rinse cycle with fresh water, this flushes the accompanying brine from the resin which reverses the multi-valency of the brine and thus the zinc-based brine is easily removed from the resin with just tap water. For this reason, it is important that the FO brine draw include or consist of a blend of multiple brine solutions blended together or be in combination with an acid (such as HCl). These include zinc chloride, zinc bromide, sodium chloride, and or magnesium chloride as examples (but not limited to). To recover the costly brine draw material and minimize waste, a strong base anion exchange resin is used to first separate the zinc bromide or zinc chloride brine salts thus leaving the effluent solution as only pure water combined with the magnesium chloride, sodium bromide, or sodium chloride brine draw to be processed by the high salinity reverse osmosis system. The strong base anion resin is regenerated with clean, permeate water from the final step of the process. The high salinity reverse osmosis (or nanofiltration) system is then used as the final processing step to produce permeate water for reuse at the same time producing a high total dissolved solids brine to be blended with the regenerant from the resin stage in the process.

Overall system recovery rate can be as high as 50-80% depending on the influent water quality and salt content, while net operating pressures are minimal due to low fouling factors and thus optimal energy efficiency (no evaporation process required).

This process has the potential to treat incoming water streams that are over 300,000 ppm TDS and extract pure water from the stream without using evaporative processes. This has yet to be achieved using any other technology outside of high energy cost, high operating cost, and high capital cost evaporator technologies.

Exemplary applications for the system and process include sea water desalination, mining wastewater treatment, produced water and frac flow back treatment, industrial waste water recycling, food processing waste water recycling, brine concentration "weight up" processes, juice concentration food processing, and power plant effluent treatment.

Following is an equipment list for the system illustrated in FIG. 1:

Equipment Item List: 1) Influent Storage water tank for primary feed water to the system; 2) Feed water pump; 3) Process water fed into FO membrane system; 4) Forward Osmosis membrane system; 5) Effluent Waste Rejection from the FO system; 6) Diluted Brine Draw containing Zinc Complex (or iron) and other brine salts (example sodium chloride, magnesium chloride); 7) Media pump to Anionic media 8) Adsorption media (resin or membrane) for Zinc complex; 8A, 8B) Vessels for holding the adsorption media; 9) RO Feed pump; 10) Diluted Brine Draw with No Zinc or Iron Complex; 11) High Salinity Reverse Osmosis system; 12) Concentrated Brine Draw with sodium or magnesium chloride only (no zinc complex 13) Brine Storage and Mix tank; 13A Heat exchanger for heating if necessary; 14) Zinc (or Iron) Chloride Brine from Brine Flush; 15) Forward Osmosis pump; 16) Cooling Heat Exchanger; 17) Concentrated Brine draw containing both Zinc (or iron) chloride and sodium (or magnesium) chloride; 18) RO Permeate Water; 19) RO Permeate Product Water for Adsorption Rinse; 20) Water Storage tank for RO permeate and Resin Flush; 21) Pump for Resin Rinse process to neutralize zinc chloride complex; 22) Control Valve; 23) Media Vessel Controls.

Second Embodiment

Figure 2:
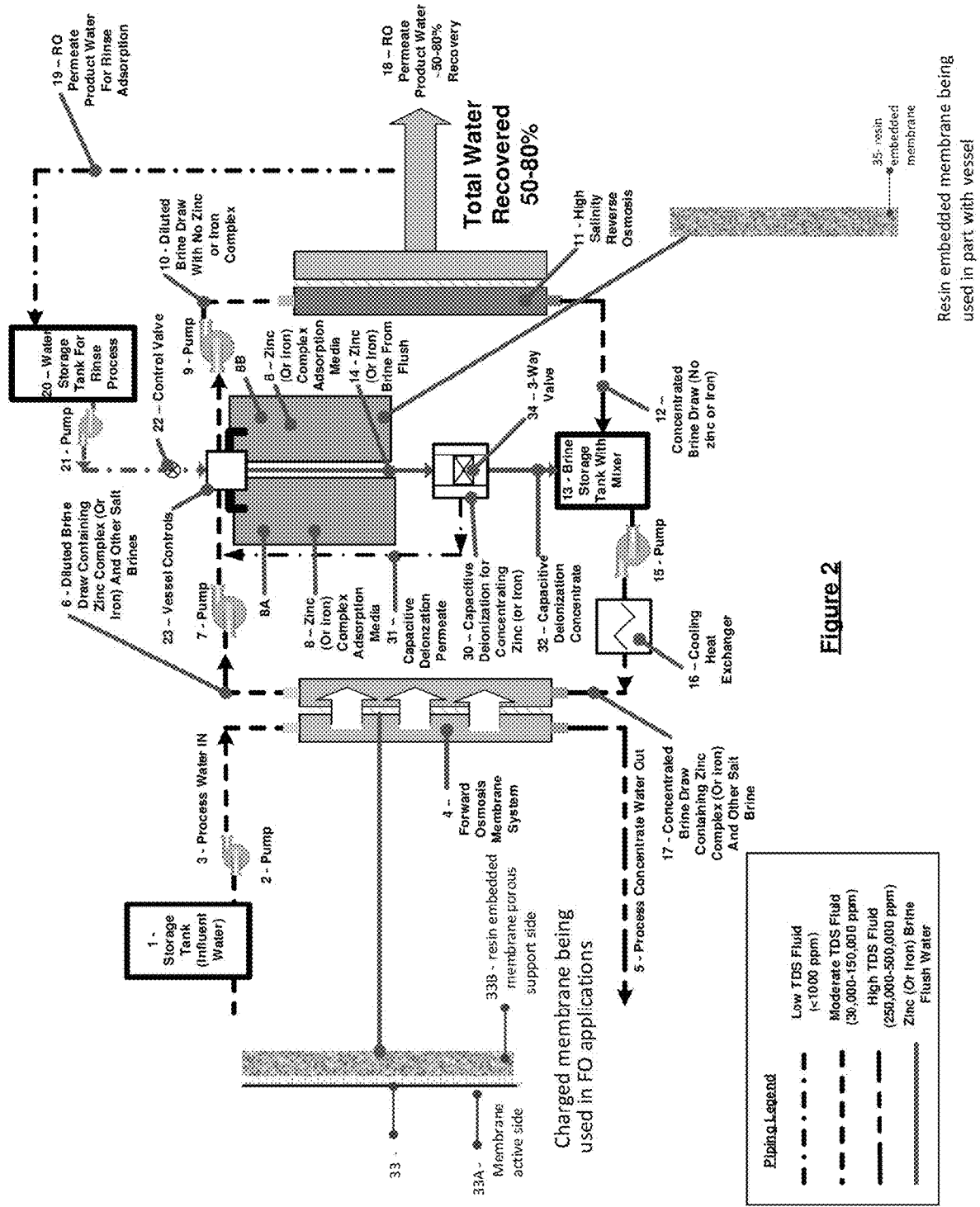
FIG. 2 is a schematic diagram illustrating a second exemplary embodiment of a high salinity water purification system and process.

FIG. 2 is a schematic diagram illustrating a second embodiment of a high salinity water purification system. This system employs a three-step brine draw recycling process. The process uses the combination of a strong anionic base adsorption ion resin or strong base anion adsorption membrane, sometimes referred to as "media," in addition to a capacitive deionization system to recycle a zinc-based (or iron) brine draw combined with a sodium or magnesium-based brine draw (or acid) (which may include LiCl, CaCl2), LiCl and HCl, HCl, KCl, CsCl, NH 4Cl, and HONH 3Cl) and other halo-metal complexes. The brine draw is processed by a high salinity reverse osmosis system for improved brine draw recycling performance, overall higher efficiency, and lower operational cost.

The system and process of FIG. 2 differs from that of FIG. 1 in the rinse process. The purification cycle for the process of FIG. 2 is identical to that of the process of FIG. 1. The process of FIG. 2 utilizes an alternative adsorption media rinse.

The purpose of the capacitive deionization system is to further remove pure water and thus concentrate up the flushed zinc salts removed from the flushing/rinsing process. This process is used in lieu of an evaporator or heat exchanger to evaporate pure water off. Capacitive deionization is a more energy efficient method of removing pure water when compared to evaporator technologies.

The capacitive deionization system 30 (FIG. 2) works as follows. An aqueous stream containing dissolved solids (salt) is passed between two oppositely charged super capacitors (electric double layer capacitors, or EDLC). As the liquid passes through the dielectric spacer separating the capacitors, ions are attracted to the oppositely charged capacitor layers. The ions leave the water within the dielectric layer, pass through a charge specific membrane coating, and are adsorbed onto the surface area of the carbon super capacitor. When the capacitors have filled with ions, the polarity is reversed, and the ions are discharged back into the dielectric spacer and removed from the system. A 3-way valve is situated at the outlet of the device which directs the brine 32 away from the cleaned water 31.

Equipment Item List (items added to equipment of the embodiment of FIG. 1): 30) Capacitive Deionization System; 31) Capacitive Deionization Permeate; 32) Capacitive Deionization Concentrate Waste Containing Zinc chloride concentrate; 30A) 3-Way Valve.

The first step in processing the brine in a rinse cycle is to separate the zinc-based brine from a sodium, magnesium-based brine, or acid (combined with pure water). After flushing with fresh, low TDS water (first step), the eluted brine is concentrated (second step) with the capacitive deionization system 30. The sodium or magnesium-based brine (or acid) is purified with a standard high salinity RO system, thus producing clean water and a re-concentrated brine. This re-concentrated brine is then blended with the eluted zinc-based brine from the media rinse and capacitive deionization processes. The combined brine solution is then fed back to the FO membrane and is used in a continual process.

The first step is done in a manner that uses a low-energy strong base anion exchange media (resin and/or resin embedded membrane) and fresh water for the flush. This flushed brine from the offline media vessel 8A or 8B is then concentrated with the capacitive deionization (CD) system 30 to get maximum concentration from the zinc-based (or iron) brine. The CD permeate 31 is fed back to the vessel controls 23 for recycling. The CD concentrate is passed into the brine storage tank 13.

The high salinity reverse osmosis (or nanofiltration) system is then used as the final processing step to produce permeate water for reuse at the same time producing a high total dissolved solids brine to be blended with the capacitive deionization concentrate from the first media stage in the process. Overall system recovery rate can be as high as 50-80% depending on the influent water quality and salt content, while net operating pressures are minimal due to low fouling factors and thus optimal energy efficiency (no evaporation process required).

Figure 3:
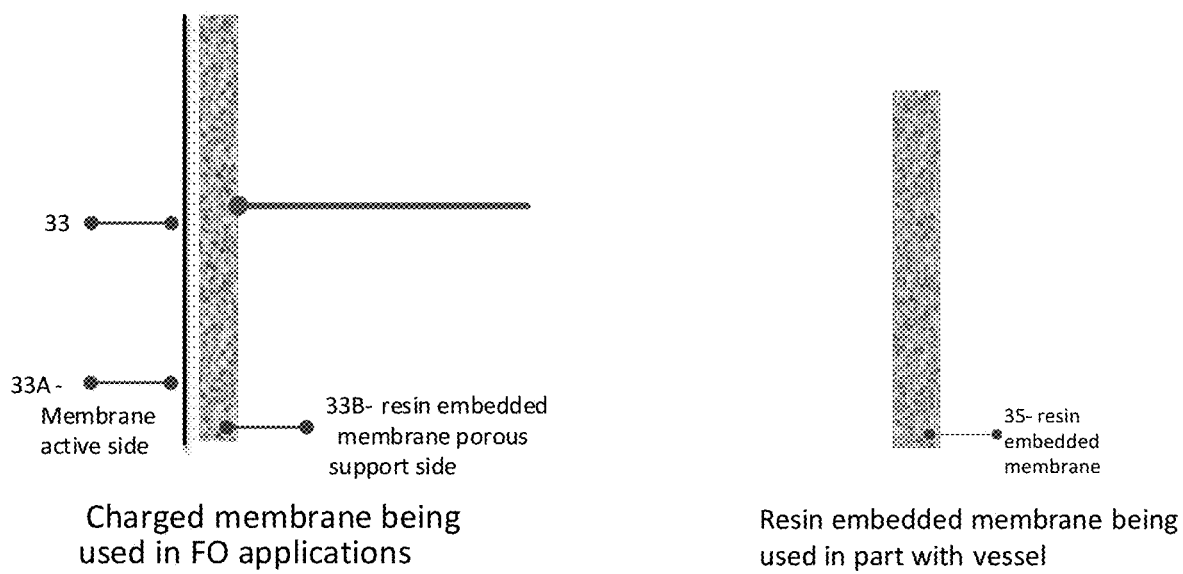
FIG. 3 illustrates an exemplary embodiment of a resin embedded membrane system.

Charged and Resin-Embedded Membranes:

A resin embedded membrane is illustrated in FIG. 3. The resin embedded membrane 35, which may be fabricated as spiral wound, hollow fiber, or plate and modules, can be used as an adsorption media (in to the vessel, item 8A or 8B in FIG. 1 and FIG. 2) or can also be used as the FO membrane.

Resin embedded FO membranes 33, also referred to as "charged" membranes, can be of thin film composite, asymmetric, or hollow fiber morphologies. Active resin, before casting the membrane, is dispersed in polymer solution. "Active" resin is resin that is not loaded with trapped ions, and thus sometimes does not need to be regenerated. Resin loading varies with thickness and application of membrane. In general, higher resin loading (example >50 wt % resin) imparts brittleness of the membrane. In real FO applications, the membrane porous support side 33B (with active resin) always needs to be exposed to the draw side. A membrane with an active resin layer is sometimes referred to herein as a "charged membrane," and can be used in FO, NF, RO and ED applications.

In the following description, zinc-based draw solutions are specifically described. Zinc-based (or iron) solutes when combined with sodium or magnesium-based draw (or acid) will form a divalent anionic complex of [ZnCl4]2-, which has a direct chemical selective affinity for strong base anion resin present in the charged membrane 33 used in the FO 4. The adsorbed complex ion serves as an osmolyte to pull more water from the feed side resulting in higher flux values from the FO membrane.

An added advantage with the charged membrane is that it does not require a rinse or flush step to destabilize and then remove zinc chloride with water. The fresh water continuously pulled by the FO membrane from the feed or process water 3 to the draw side naturally flushes/rinses the ion complex from the FO membrane. At the same time those are replaced with a new pool of ion-complexes from the draw solution 17. In this way the membrane always remains active or in a charged state that affects the overall flux through the membrane.

FIG. 4 illustrates an exemplary embodiment of a system in which the rinse or flush elements are omitted, with the FO using a charged membrane as discussed above. The system of FIG. 4 is similar to that of FIG. 1, except that the vessels 8A, 8B, pump 9, the tank 20, pump 21 and control valve 22 are omitted. An acid feed tank 26 with pump, a pH controller 28 and pH sensor 29 are added to selectively add acid to the brine storage tank 13. The purpose of the pH control in this exemplary embodiment is as follows. Zinc chloride converts from the usual state of being cationic to anionic in two ways: mixing in a brine solution where the total dissolved solids are over 75,000 ppm or in an acidic condition where the pH is below approximately 3.0 pH. Both of these conditions convert the zinc chloride to an anionic form which will allow it to absorb onto the surface of either the resin or anionic membrane. As such, there is a supplemental pH sensor 29, acid feed line 27, pH controller 28, and acid feed tank 26 to feed supplemental acid feed in the event that the pH becomes too high. Thus, the acid feed system is designed to ensure the pH is correct in order for the zinc chloride to operate in anionic form.

Heavy metals such as Au, Pb, Cd, Fe, Ni, Cu, when exposed to specific environment example acidic conditions, form anion complexes. These valuable/toxic compounds can be successfully trapped and extracted by charged membranes, in the process concentrate water out 5. In a similar way, cyanide makes stable anionic complexes with heavy metals, and those ferrocyanides are removed from wastewater with charged membranes. Similarly, the charged membranes can be used in extraction of Nitrate salts from agricultural water, and boron, and mercury removal from brine liquids.

Charged membranes can be used as a standalone membrane in the FO process or in combination with resin or resin embedded membranes in the vessels 8A, 8B.

It is relatively easier to prepare resin-embedded membranes, being used in the resin vessels 8A, 8B. The resin-embedded membranes can be used in place of or in addition to the adsorption media in the vessels 8A, 8B. Resin embedded membranes cannot be used as a charged membrane. However, the charged membranes can, depending on specific application, be used interchangeably with resin-embedded membranes.

To enhance the propensity of draw and depending on the availability of room in the draw chamber of the FO unit, a sack of active resin can be placed in the draw chamber.

Resin-embedded membranes are used in place of adsorption media 8 or along with adsorption media 8. The media rinse system includes flushing with water, flushing with alkaline water etc. Flushing can be done at various temperatures, flow rates.

1. Differences Between Charged Membrane and Resin Embedded Membrane

| Charged Membrane | Resin embedded membrane |
|---|---|
| Charged membranes contain active or barrier layer. Generally produced by Phase inversion process (membranes prepared by this method are called asymmetric membranes) or phase inversion followed by interfacial polymerization method (membranes prepared by this method are called thin film composite membranes, TFC membranes) | Resin embedded membranes generally prepared by phase inversion process with or without an active layer |
| Relatively thinner membranes. Thickness of membrane varies 50-250 micron. | No restriction on membrane thickness |
| These membranes are used in various membrane separation processes such as FO, RO, NF etc | These membranes only being used in resin vessel |
| Charged membranes contain active resin embedded in porous support layers. | These membranes contain active resin throughout across the membranes |
| In general contain lesser amounts of active resin | No restrictions on active resin loading |
| These membranes can be used in separation applications (FO, RO, NF etc.) and in vessels | These membranes have restricted application (in this case only in the vessel) |
| Quality of active layer plays a more important role than quantity of resin. | Quantity of resin (loading) plays an important role |

Barrier/Active Layer

Charged membranes contain an active or barrier layer. Generally produced by a Phase inversion process (membranes prepared by this method are called asymmetric membranes) or phase inversion followed by interfacial polymerization method (membranes prepared by this method are called thin film composite membranes, TFC membranes).

Preparation of asymmetric membranes is a single step process. However, TFC membranes needs a two-step preparation.

The quality (thickness, uniformity, cross link density etc.) of the active layer predominately decides the overall salt rejection and water flux through the membrane.

The thickness of the barrier/active layer in TFC membranes varies between 50-200 nanometers whereas it will be about a few microns in asymmetric membranes.

Although the foregoing has been a description and illustration of specific embodiments of the subject matter, various modifications and changes thereto can be made by persons skilled in the art without departing from the scope and spirit of the invention.

What is claimed is:

1. A high salinity water purification process for processing high salinity influent fluid to obtain purified water, comprising:
   passing a stream of the influent fluid in an input along a first side of a forward osmosis (FO) membrane and delivering an output stream from an output port, the influent fluid having moderate levels of total dissolved solids (TDS) in the range of 30,000 to 150,000 ppm;
   wherein the FO membrane includes an anionic resin-embedded charged FO membrane including an active or barrier layer;
   passing a stream of a concentrated brine draw from an input along a second side of the forward osmosis membrane, the concentrated brine having high levels of TDS in the range of 250,000 to 500,000 ppm, the concentrated brine draw including a combination of a zinc complex or an iron complex and another salt brine or acid;
   the concentrated brine drawing pure water through the FO membrane from the influent fluid, concentrating the level of TDS in the output stream and diluting the concentrated brine draw, and zinc or iron-based solutes when combined with the salt brine or acid forming a divalent anionic complex, which has a direct chemical selective affinity for strong base anion resin present in the charged membrane, to pull more water from the first side resulting in higher flux values from the FO membrane;
   passing the diluted brine draw over an anionic adsorption media in a vessel to adsorb the zinc or iron complex onto the adsorption media to provide a diluted brine draw with little or no zinc or iron complex;
   pumping the diluted brine draw with little or no zinc or iron complex into a high salinity reverse osmosis (RO) or nanofiltration system to obtain purified water on the output of the RO or nanofiltration membrane and an RO stream of concentrated brine draw without zinc or iron complex which did not pass through the membrane.

2. The process of claim 1, wherein the anionic adsorption media in the vessel comprises a resin embedded membrane.

3. The process of claim 2, further comprising:
   regenerating the anionic adsorption media in the vessel by rinsing the media with fresh water to remove the zinc or iron complex to form a resultant brine with zinc or iron complex;
   combining the resultant brine with the RO brine to reconstitute a concentrated brine draw for use in the FO process.

4. The process of claim 1, wherein the charged, resin-embedded FO membrane comprises one of an active resin-embedded asymmetric or multilayer membrane, and a resin-embedded single layer asymmetric membrane.

5. The process of claim 4, wherein the charged, resin-embedded FO membrane is one of thin film composite (TFC), asymmetric, and hollow fiber forms.

6. The process of claim 1, wherein the anionic resin-embedded charged FO membrane include a membrane active side at the input side and a resin-embedded membrane porous support side at the output side.

7. A system for purifying high salinity influent fluids, comprising:
   a forward osmosis (FO) system comprising an FO membrane, an influent side input port and an influent side output port arranged on in influent side of the FO membrane, and a FO output side input port and a FO output side output port arranged on an output side of the FO membrane;
   wherein the FO membrane includes a strong base anionic resin-embedded charged FO membrane;
   one or more vessels holding an anionic base adsorption vessel media for removing zinc or iron complex from a brine;
   a reverse osmosis (RO) or nanofiltration system;
   the FO system configured to receive the influent fluid at the influent side input port and to pass concentrated fluid out the influent side output port;
   the RO or nanofiltration system configured to receive input fluid at an input port and to pass concentrated fluid which did not pass through a membrane of the RO or nanofiltration system at an output port, and purified fluid which has passed through the membrane;
   a recirculating brine flow path;
   a concentrated brine draw containing zinc or iron complex and another salt brine or acid pumped into the FO output side input port, the concentrated brine draw having a high higher level of total dissolved solids (TDS) than the TDS level in the influent fluid;
   a pump for pumping the concentrated brine draw through the FO system from the FO output side input port to the FO output side output port, the brine draw forming a divalent anionic complex, which has a direct chemical selective affinity for strong base anion resin present in the charged membrane to pull more water from the first side resulting in higher flux values from the FO membrane;
   the recirculating brine flow path passing from the FO output side output port to the one or more vessels to remove the zinc or iron complex from the concentrated brine to the RO or nanofiltration system and to the FO output side input port; and
   wherein the system is free of a separate rinse or flush function to maintain the charged state of the FO membrane, the fresh water drawn through the FO membrane naturally during operation serving to flush/rinse the divalent anionic complex from the FO membrane, the draw solution serving to replace the flushed/rinsed divalent anionic complex with a new pool of divalent anionic complex, so that the membrane remains in an active or charged state affecting an overall flux through the FO membrane.

8. The system of claim 7, wherein the resin-embedded charged FO membrane comprises one of an active resin-embedded asymmetric or multilayer membrane, and a resin-embedded single layer asymmetric membrane.

9. The system of claim 7, wherein the resin-embedded charged FO membrane is one of thin film composite (TFC), asymmetric, and hollow fiber forms.

10. The system of claim 7, wherein the resin-embedded charged FO membrane include a membrane active side at the input side and a resin-embedded membrane porous support side at the output side.

11. The system of claim 7, wherein the anionic adsorption media in the vessel comprises a resin embedded membrane.

12. The system of claim 11, further comprising;
a rinse system for rinsing the adsorption media in the vessel with fresh water in a rinse cycle, the rinse system comprising:
a brine storage tank in fluid communication with the one or more vessels;
a fresh water source;
a valve system for passing fresh water into one of the vessels from the fresh water source to rinse the adsorption media to remove the zinc or iron complex from the anionic adsorption media;
a brine storage tank for storing brine from the rinsing including the zinc or iron complex;
a mixer for mixing the stored brine with the concentrated fluid from the RO or nanofiltration system to pass into the brine recirculation path.

13. A system for purifying high salinity influent fluids, comprising:
a forward osmosis (FO) system comprising an FO membrane, an influent side input port and an influent side output port arranged on in influent side of the FO membrane, and a FO output side input port and a FO output side output port arranged on an output side of the FO membrane;
wherein the FO membrane includes a strong base anionic resin-embedded charged FO membrane;
a reverse osmosis (RO) or nanofiltration system;
the FO system configured to receive the influent fluid at the influent side input port and to pass concentrated fluid out the influent side output port;
the RO or nanofiltration system configured to receive input fluid at an input port and to pass concentrated fluid which did not pass through a membrane of the RO or nanofiltration system at an output port, and purified fluid which has passed through the membrane;
a recirculating brine flow path;
a concentrated brine draw containing zinc or iron complex and another salt brine or acid pumped into the FO output side input port, the concentrated brine draw having a higher level of total dissolved solids (TDS) than the TDS level in the influent fluid;
a pump for pumping the concentrated brine draw through the FO system from the FO output side input port to the FO output side output port, the brine draw forming a divalent anionic complex, which has a direct chemical selective affinity for strong base anion resin present in the charged membrane to pull more water from the first side resulting in higher flux values from the FO membrane;
the recirculating brine flow path passing from the FO output side output port to the RO or nanofiltration system and to the FO output side input port; and
wherein the system is free of a separate rinse or flush function to maintain the charged state of the FO membrane, the fresh water drawn through the FO membrane naturally during operation serving to flush/rinse the divalent anionic complex from the FO membrane, the draw solution serving to replace the flushed/rinsed divalent anionic complex with a new pool of divalent anionic complex, so that the membrane remains in an active or charged state affecting an overall flux through the FO membrane.

14. The system of claim 13, wherein the resin-embedded charged FO membrane comprises one of an active resin-embedded asymmetric or multilayer membrane, and a resin-embedded single layer asymmetric membrane.

15. The system of claim 13, wherein the resin-embedded charged FO membrane is one of thin film composite (TFC), asymmetric, and hollow fiber forms.

16. The system of claim 13, wherein the resin-embedded charged FO membrane include a membrane active side at the input side and a resin-embedded membrane porous support side at the output side.

17. The system of claim 13, further comprising:
an acid feed system for selectively feeding acid into the recirculating brine flow path to ensure the pH is correct in order for the zinc or iron complex to operate in anionic form.

18. The system of claim 17, wherein the recirculating brine flow path includes a brine storage tank receiving the concentrated fluid from the RO or nanofiltration system, and the acid feed system includes a pH sensor for monitoring the pH of the concentrated fluid in the brine storage tank, an acid feed tank holding the acid, an acid feed line between the brine storage tank and the acid feed tank, a pump for pumping acid through the acid feed line, and a pH controller responsive to the pH sensor for controlling the pump.

* * * * *